Feb. 26, 1952     J. A. ROBERTS     2,587,384
ANTIHUNTING TEMPERATURE SENSITIVE DETECTOR
Filed Dec. 15, 1949     2 SHEETS—SHEET 1
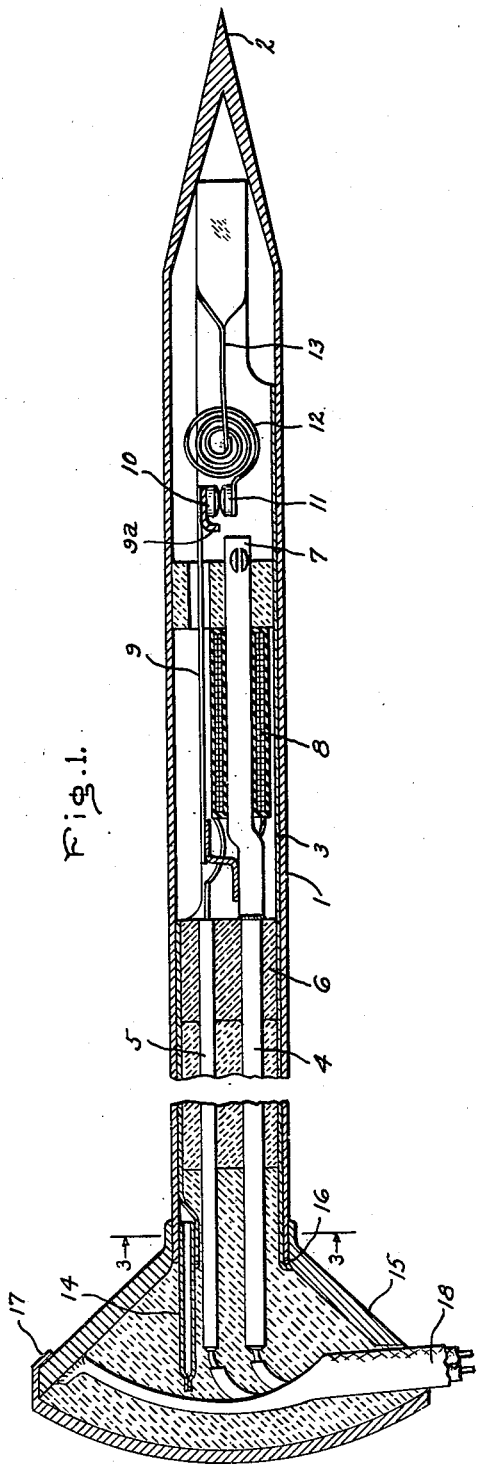
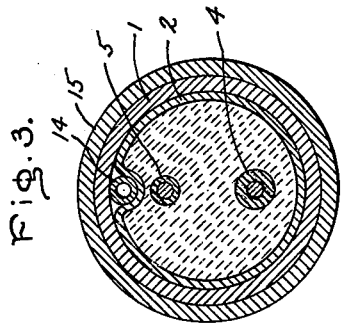
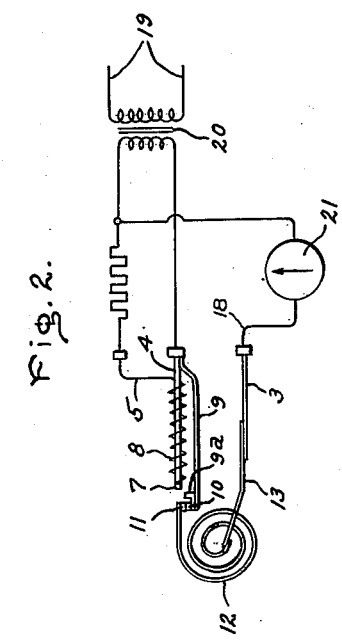
Inventor:
John A. Roberts,
by Russell A. ......
His Attorney.

Feb. 26, 1952     J. A. ROBERTS     2,587,384
ANTIHUNTING TEMPERATURE SENSITIVE DETECTOR
Filed Dec. 15, 1949     2 SHEETS—SHEET 2
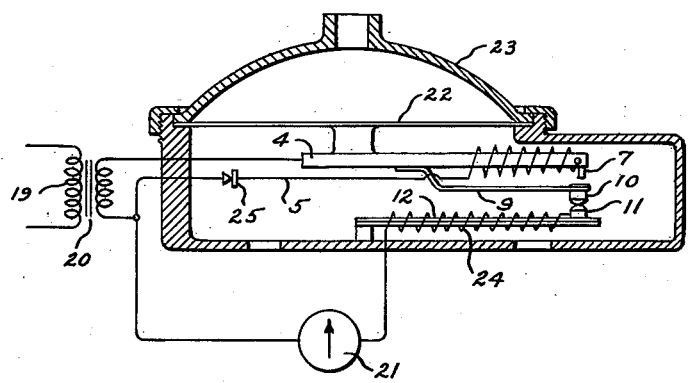
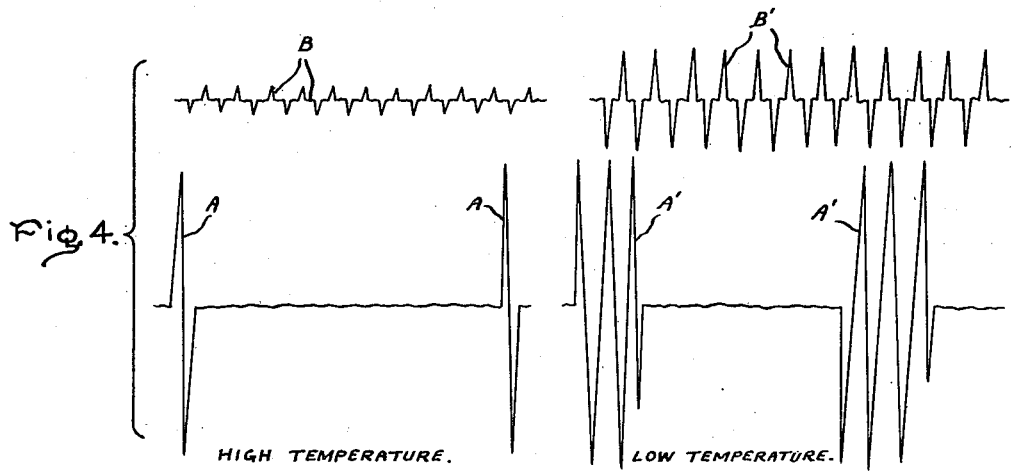
Inventor:
John A. Roberts,
by Russell A. Warner
His Attorney.

Patented Feb. 26, 1952

2,587,384

UNITED STATES PATENT OFFICE 2,587,384

ANTIHUNTING TEMPERATURE SENSITIVE DETECTOR

John A. Roberts, East Lynn, Mass., assignor to General Electric Company, a corporation of New York Application December 15, 1949, Serial No. 133,169

4 Claims. (Cl. 73—352)

My invention relates to a temperature sensitive detector of the type employing a bimetallic contact device which opens and closes a signal circuit as the temperature of the bimetal varies between predetermined limits, and it is the object of my invention to improve the operation of such devices by reducing the hunting tendency and contact sticking in such devices.

In carrying my invention into effect, I superimpose upon the thermal responsive vibratory action of the contact mechanism an electromagnetic vibratory action of a frequency much higher than that of the thermal responsive vibratory action, such that the normally slow, variable pulse rate of the contact device is changed to a higher constant frequency pulse rate. The resultant root mean square value of the current which is passed by the contacts is not changed by reason of my invention, but the detector action is much smoother and results in other advantages as will be explained.

The features of my invention which are believed to be novel and patentable will be pointed out in the claims appended hereto. For a better understanding of my invention reference is made in the following description to the accompanying drawing in which Fig. 1 represents an enlarged view of a temperature measuring detector embodying my invention with the enclosing case shown in section. Fig. 2 represents a wiring diagram of a complete temperature measuring system to which my invention is applied. Fig. 3 is a cross-sectional detail of Fig. 1. Fig. 4 represents comparative oscillograph records of the current through the contacts of temperature responsive devices before and after being equipped with my antihunt regulator. Fig. 5 represents a pressure measuring detector employing my invention.

Referring now to Fig. 1, I represents a stainless steel casing of circular cross section of a temperature sensitive detector probe having a sharpened end 2 to enable the probe to be inserted into a roast of meat, for example, for the purpose of determining its internal temperature. The other end of the probe casing is temporarily left open for the insertion of a chrome-iron sleeve 3 which supports within it a pair of conductor wires 4 and 5 insulated from each other and from the sleeve 3 by insulating supporting structure including a glass bead seal 6 which forms an airtight partition across the sleeve 3. The conductor 4 is to be magnetic, and I have found it convenient to make both conductors 4 and 5 from a commercially available copper covered iron wire.

The forward end of wire 4 serves as a magnetic pole piece 7 and the wire is electrically connected to the adjacent end of a coil 8 wound about the wire 4 adjacent the pole end 7 of the wire 4. The other end of coil 8 is connected to lead-in wire 5 and, of course, the coil 8 is suitably insulated between its turns and from wire 4. Welded or otherwise secured to wire 4 closely adjacent the rear end of coil 8 is a spring steel reed 9 which has on its free end a magnetic pole shoe 9a in magnetic armature relation with the pole 7. The length of the electromagnet and armature thus formed may be about one inch and otherwise proportional about as illustrated, and the free air gap spacing between the armature 9a and pole 7 may be about 0.01 inch. On the same side of the end of armature reed 9 as pole 7 is a contact button 10 which cooperates with a contact button 11 on the free end of a temperature sensitive bimetallic contact spiral 12 having its other end electrically and mechanically secured to an extending portion of sleeve 3 as by a tap 13 of spring steel which seems to protect the bimetal spiral from shock. The bimetal contactor spiral 12 is arranged to turn away from contact 10 upon an increase in temperature above a predetermined value and to close on contact 10 at and below such predetermined temperature when the contact 10 is in its free nonvibrating condition. The normal temperature at which the contacts 10, 11 will separate is readily adjusted to the desired value as by bending the tab 13.

The electromagnetic vibrator and bimetallic contactor parts just described are assembled and adjusted, and the assembly sealed in and to the sleeve 3 prior to inserting the sleeve into the casing 1. A hollow metallic tube 14 may be inserted into an indentation along one edge of sleeve 3 near the head end thereof in a manner best shown in Fig. 3. The sleeve with the parts thus assembled is then inserted into the open rear end of tube 1. A flanged head piece 15 is then added as shown in Fig. 1, and the sleeve 3, tube 14 and head piece 15 are all silver soldered together and to casing 1 at its open end as indicated at 16, so that the electromagnet and bimetal contact parts are now contained in an airtight compartment, except for a metal tube 14, sealed by such silver solder 16 and by the glass bead 6. The tube 14 may now be used to evacuate such chamber and to introduce any suitable inert gas therein. I prefer to use nitrogen at atmospheric pressure as such gas. The tube 14 is then sealed and cut off at the desired length and may be used as the electrical connection to the tab end of bimetallic arm 12 through metallic sleeve 3. A closure cap 17 is provided to be permanently or removably secured over the head piece 15, and these parts will be provided with an opening for the entrance of a suitably protected cable 18 for the lead-in wires. The lead-in wires are welded to the exposed ends of conductors 4, 5 and 14 before the cap 17 is added. Where a metal armored cable is used, the sheath thereof may be used as the conductor to the sleeve 3 and be brazed to the flange 15. So far as the main feature of my invention is concerned, the structural details of the probe may vary considerably from those above described. The unoccupied space in the head 15—17 may be filled up with an insulating packing.

A suitable electric circuit for the apparatus when used for measuring temperature is illustrated in Fig. 2, where 19 represents a standard 110-volt, 60-cycle source of supply, and 20 a step-down transformer such as will give about five volts from its secondary. The contacts 10 and 11 are connected across this 5-volt source of supply through an ammeter 21. The electromagnetic coil 8 is also connected across the 5-volt source of supply. The current of such coil 8 does not pass through the ammeter.

If the electromagnet comprising coil 8, its magnetic core 4, and armature 9 were omitted or if the coil 8 were disconnected so that contact 10 would remain stationary, the operation of the apparatus would correspond to known temperature measuring apparatus and would function as follows. The probe or that part thereof surrounding its bimetal contact device is located at the point or area where the temperature is to be measured. It is adjusted so that the contacts are closed at or slightly below the lowest temperature to be measured. A certain value of current thus flows through the ammeter and through the bimetal 12 at such temperature. This current heats the arm 12 (or a separate heater through which the current flows heats the arm), and also the current causes a maximum deflection of the ammeter.

At such minimum temperature the heat carried away from bimetal 12 to the surrounding area is just sufficient to prevent opening of the contacts, and the full-scale deflection of the instrument is calibrated or marked with such minimum temperature value. Now, when the temperature to be measured rises, less heat is conveyed away from 12 and it thus flexes and opens the contacts. This cuts off its own heating and it cools and closes the contacts, and this action is repeated. The higher the temperature to be measured, the lower will be the average current through 12 that is necessary to reopen the contacts. As the temperature to be measured increases, the pulse rate decreases and the contacts remain open a larger portion of the time. Hence, a correspondingly smaller average current flows through the ammeter. The ammeter is of a type which has considerable damping and preferably, also, of a type which is designed to measure the root mean square value of the current flowing. Hence, the ammeter tries to average the root mean square value of the current pulses and has a deflection less than the original value by an amount which is proportional to the heat supplied by the current to 12 which is necessary to keep the contacts from remaining closed. This reduction in instrument deflection is proportional to the temperature to be measured and, hence, the ammeter scale may be calibrated in terms of the temperature to be measured.

Representative pulse rates of such prior art devices when operating satisfactorily vary between two and eight pulses per second. At the higher measurement temperatures when the pulse rate is slow, there is considerable flickering of the ammeter pointer even in a well damped instrument. Also, at all temperatures the breaking action at the contacts tends to cause sticking and freezing of the contacts, which augments the difficulty and shortens the useful life of such contacts.

According to my invention the contact 10, which in comparable prior art devices was normally stationary, is vibrated at a high rate of speed, in the example given, at 120 times per second, by the vibrator electromagnet which vibrates reed armature 9 once for each half cycle of the 60-cycle alternating current supply.

When the electromagnet is energized on the positive and negative half waves of the alternating current, the reed armature 9a is attracted toward pole 7, and contact 10 moves toward contact 11, and as the alternating current reverses and passes through zero value, the reed 9 springs away from pole 7, and its contact 10 moves away from contact 11. As a result of this vibration of contact 10, the contacts 10 and 11 instead of remaining closed for several cycles and then open for several cycles, remain closed for only a fraction of each half cycle and open for the remainder of each half cycle, and the fraction of time per half cycle of contact closure is inversely proportional to the temperature to be measured. The average amount of heating current supplied to the bimetal spiral 12 and the average amount of heating furnished are the same as before, but the current pulses are broken up into a very much larger number of smaller pulses, and the pulse rate instead of being variable is constant.

Also, I preferably design the vibratory reed contact device so that the contacts will generally open at or near the zero part of the alternating current wave. For use on a 60-cycle supply and where energization of the electromagnet moves its contact towards closing position. I may design the reed so that it will have a natural period of vibration somewhat higher than the 7200 per minute pulsation rate of the frequency. Thus, if the reed is designed so that it has a natural period of vibration of around 8000 cycles per minute, its phase will tend to lead that of the alternating pulsations and will tend to open the contacts near the zero value of the alternating current through the contacts. This, of course, assumes that the electromagnet which vibrates the reed is supplied from the same alternating current source which supplies the circuit through the contacts, which is the case in the arrangement described. This tuning of the reed, however, is not essential to my invention because the vibratory action will provide a quick make and break of the contacts and minimizes any tendency of the contacts to arc and become welded together.

The difference in the operation before and after applying my invention is illustrated in the records of Fig. 4. Records A and A' are approximate reproductions of oscillograph records of the current through the bimetal of a temperature sensitive detector at high and low temperatures respectively where the detector does not have any improvement, and records B and B' are corresponding records under similar conditions after my invention has been added. The central line of each record represents zero current, the portions above such line the positive portions of a cycle, and the portions below such line the negative portions of a cycle. In records A and A' it is noted that when current flows, it flows at full value during one or more cycles and the pulse rate varies from a condition at high temperature where the contacts are closed during about one cycle with a full open period of many cycles, to a condition where the contacts are closed for several cycles and an open period of several cycles at low temperatures. With my invention, curve B, the pulse rate is constant at 120 cycles per second, but the current flow per cycle varies substantially uniformly in inverse proportion to the temperature to be measured.

It is evident that a current measuring instrument, such as the instrument of Fig. 3, will be able to average the current of curve B without fluctuation between pulses, while the irregular pulses of curve A will cause fluctuation in the averaging measurement. Equally important is the fact that the vibratory action present in my improved detector prevents sticking and freezing of the contacts, while the conditions present in the type of operation represented by curve A are favorable to sticking and freezing of the contacts. This means that a detector equipped with my invention will have a longer trouble-free life than one without such improvement. The damping requirements of the measuring instrument used become much less exacting with my invention.

In Fig. 5 my invention is shown as as applied to a pressure measuring thermal type of detector. The parts corresponding to those previously described are identified by similar reference characters. The magnetic wire 4 is shown mounted upon the under side of a flexible diaphragm 22. The upper side of the diaphragm is exposed to a pressure chamber 23, and the diaphragm is designed to flex downward with an increase in pressure in the chamber 23. The apparatus is intended to be used in a substantially constant temperature area or designed such that ordinary ambient temperature changes do not influence its operation. The fixed end of the bimetal strip 12 is supported in fixed relation to the pressure chamber 23, but in movable relation to the center of flexible diaphragm 22.

The parts are so adjusted that the contacts 10 and 11 just remain open at the minimum pressure to be measured and with the vibrator in operation. Under this condition no current flows in ammeter 21. Upon an increase in pressure in chamber 23, diaphragm 22 is flexed downward and moves the electromagnet parts 4, 7, 9 and 10 downward such that contacts 10 and 11 begin to touch as the contact 10 vibrates away from pole 7. The bimetal 12 has a heater resistance wire 24 about it connected in the circuit of ammeter 21, and hence an indication is produced and arm 12 with its contact 11 flexes away from contact 10. The duration of contact per vibratory action of contact 10 thus increases with pressure in chamber 23, and the current passed per cycle increases accordingly. Hence, instrument 21 may be calibrated in pressure. A one-way rectifier 25 is contained in the circuit of coil 8 so that the period of vibration of the armature 9 is once per cycle instead of being twice per cycle. The weight and flexibility of the reed armature 9 should preferably be such as to have a natural period of vibration near to that corresponding to the forced vibration rate in each case.

In Fig. 5 the current in the ammeter 21 increases with increase in the pressure to be measured, whereas in Fig. 1 it decreased with rise in temperature to be measured. Also, in Fig. 5 the contact 10 moves away from contact 11 when the electromagnet is energized, whereas in Fig. 1 the contact 10 moves toward contact 11 when the electromagnet is energized. In the case of Fig. 5 it will be desirable to tune armature 9 to have a somewhat slower natural rate of vibration as compared to the electrical vibration rate in order to have the contacts open near the zero point of the alternating current wave. The advantages of the invention are the same as those previously mentioned in connection with Fig. 1.

Although the antihunt regulator described is very effective, it costs little and requires little space.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, a measuring detector comprising first and second cooperating contacts, a bimetal temperature sensitive member for moving the first contact towards and away from the second contact in response to the cooling and heating of said bimetal member respectively, electrical connections for causing the electrical heating of said bimetal member when the contacts are closed, an electromagnet having a resiliently mounted armature on which said second contact is mounted for moving said second contact towards and away from the first contact, a commercial source of alternating current supply, independent circuits from said source of supply through said contacts and to said electromagnet whereby said electromagnet is caused to vibrate its armature at a rate proportional to the frequency of such source, said resilient armature being tuned to have a natural rate of vibration different from that of its electrical vibration rate by an amount and in a direction which tends to cause said contacts to open near the zero point of the wave of any alternating current flowing therethrough, and a current indicating instrument in series with the bimetal temperature sensitive member and contacts calibrated in terms of the ambient temperature of said detector, the damping of said instrument in relation to its rate of intermittent energization by reason of the operation of said electromagnet being such as to prevent flickering of the instrument indication over the temperature measuring range of said apparatus.

2. In combination, a measuring detector comprising first and second cooperating contacts, a bimetal thermal responsive element for moving said first contact towards and away from said second contact as said bimetal member is cooled and heated respectively, means whereby said bimetal member is heated in response to current flow through said contacts when closed, an electromagnet having a resiliently mounted armature on which said second contact is mounted for moving said second contact towards and away from said first contact as said electromagnet is energized and deenergized respectively, a source of alternating current supply, electrically independent circuits from said source through said contacts and electromagnet, the resilient armature of said electromagnet being designed to have a natural rate of vibration higher than its electrical vibration rate for the purpose of causing the contacts to open near the zero point of the wave of any alternating current flowing therethrough, and a current indicating instrument in series with the circuit through said contacts calibrated in terms of the ambient temperature of said detector, the damping of said instrument in relation to the rate of vibration of said armature being such as to prevent flickering of the instrument indication over the temperature measuring range of said apparatus.

3. In combination, a measuring detector comprising first and second cooperating contacts, a bimetal thermal responsive element for moving the first contact towards and away from the second contact in response to cooling and heating of said element respectively, and including electric heater means energized through said contacts when closed, electromagnetic means for vibrating said second contact towards and away from the first contact at a constant rate of several times per second such that within the measurement range of operation of said detector said contacts open and close once for each cycle of operation of said vibrating means, and a current indicating instrument in series with the bi-metal thermal response element and contacts calibrated in terms of the ambient temperature of said detector, the damping of said instrument in relation to its rate of intermittent energization due to the cyclic opening and closing of said contacts by said electromagnetic means being such as to prevent flickering of the instrument indication over the temperature measuring range of said apparatus.

4. In combination, a temperature measuring detector comprising a metallic sealed container, first and second cooperating contacts within said container, a bimetallic thermal responsive element having one end secured in fixed relation with an interior wall of said container and its other end supporting said first contact, electrical connections from the exterior to the interior of said container forming a circuit through said contacts when closed and said bimetallic element, said element including electric heater means adapted to be energized through said circuit and when energized to move the first contact away from the second contact in a direction to open such circuit, an electromagnetic vibrator supported within said container and having a vibrator armature member which supports said second contact such that the operation of said vibrator causes the opening and closing of said contacts once per operating cycle of said vibrator, electrical connections from the exterior to the interior of said container forming a circuit independent of said cooperating contacts for energizing said vibrator, said last-mentioned circuit including a magnetic lead-in wire forming the magnetic core of said electromagnetic vibrator, and a current indicating instrument in series with the bimetallic temperature response element and contacts calibrated in terms of the ambient temperature of said detector, the damping of said instrument in relation to its rate of energization by reason of the cyclic opening and closing of said contacts being such as to prevent flickering of the instrument indication over the temperature measuring range of said apparatus.

JOHN A. ROBERTS.

REFERENCES CITED

The following references are of record in the file of this patent:

UNITED STATES PATENTS

| Number | Name | Date |
|---|---|---|
| 1,885,050 | Smulski | Oct. 25, 1932 |
| 1,989,828 | Smulski | Feb. 5, 1935 |
| 2,086,323 | Garstang | July 6, 1937 |
| 2,237,003 | Kiltie | Apr. 1, 1941 |
| 2,476,534 | Cox | July 19, 1949 |

FOREIGN PATENTS

| Number | Country | Date |
|---|---|---|
| 504,773 | Germany | Aug. 7, 1930 |